United States Patent
Kobayashi et al.

(10) Patent No.: US 7,470,479 B2
(45) Date of Patent: *Dec. 30, 2008

(54) METHOD AND APPARATUS FOR WARMING-UP FUEL CELL AND FUEL CELL VEHICLE

(75) Inventors: Tomoki Kobayashi, Saitama-ken (JP); Takuma Kanazawa, Wako (JP); Yoshio Nuiya, Wako (JP); Hiroshi Shimanuki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/176,806

(22) Filed: Jul. 6, 2005

(65) Prior Publication Data

US 2005/0260466 A1    Nov. 24, 2005

Related U.S. Application Data

(63) Continuation-in-part of application No. 09/870,957, filed on May 30, 2001, now Pat. No. 6,936,359.

(30) Foreign Application Priority Data

May 30, 2000    (JP)    ............................. 2000-160098
Mar. 2, 2001    (JP)    ............................... 2001-58785

(51) Int. Cl.
    H01M 8/04    (2006.01)
(52) U.S. Cl. ............................... 429/13; 429/24; 429/26
(58) Field of Classification Search .................. None
    See application file for complete search history.

(56) References Cited

U.S. PATENT DOCUMENTS

| 5,208,114 | A | 5/1993 | Uematsu et al. |
| 5,441,819 | A | 8/1995 | Voss et al. |
| 5,518,828 | A | 5/1996 | Senetar |
| 5,543,238 | A | 8/1996 | Strasser |

(Continued)

FOREIGN PATENT DOCUMENTS

JP    58-164157    9/1983

(Continued)

Primary Examiner—Jonathan Crepeau
(74) Attorney, Agent, or Firm—Lahive & Cockfield, LLP; Anthony A. Laurentano, Esq.

(57)    ABSTRACT

A method for warming up a fuel cell system comprising; a fuel cell which generates electric current due to an electrochemical reaction between hydrogen and oxygen, and which supplies the electric current to a load, an air supply pipe for supplying air to the fuel cell as an oxidant gas, an air exhaust pipe for discharging exhaust air from the fuel cell to an atmosphere, a compressor provided on either of air supply pipe and air exhaust pipe, which carries the air and a communication pipe which returns exhaust air to air supply pipe, and which communicates exhaust air pipe with air supply pipe to form a circulation cycle including compressor. The method of the present invention comprises: detecting a temperature of the fuel cell, and if the temperature of the fuel cell is lower than a first prescribed temperature, heating fuel cell by circulating the air, which has been heated by a heat generated due to adiabatic compression through compressor prior to supplying the electric current to the load from the fuel cell.

6 Claims, 12 Drawing Sheets

(1st Embodiment)

U.S. PATENT DOCUMENTS

| | | |
|---|---|---|
| 5,928,805 A | 7/1999 | Singh et al. |
| 6,007,930 A * | 12/1999 | Adams et al. ............... 429/13 |
| 6,106,964 A | 8/2000 | Voss et al. |
| 6,268,074 B1 | 7/2001 | Siepierski et al. |
| 6,306,532 B1 | 10/2001 | Kurita et al. |
| 6,394,207 B1 | 5/2002 | Skala |
| 6,447,939 B1 | 9/2002 | Iwasaki |
| 6,497,971 B1 | 12/2002 | Reiser et al. |
| 6,936,359 B2 * | 8/2005 | Kobayashi et al. ............ 429/13 |
| 2001/0053469 A1 * | 12/2001 | Kobayashi et al. ............ 429/26 |

FOREIGN PATENT DOCUMENTS

| | | |
|---|---|---|
| JP | 62-219472 | 9/1987 |
| JP | 2000-195533 | 7/2000 |

* cited by examiner

METHOD AND APPARATUS FOR WARMING-UP FUEL CELL AND FUEL CELL VEHICLE

CROSS-REFERENCE TO RELATED APPLICATIONS

This Application is a Continuation-in-part of application Ser. No. 09/870,957 filed on May 30, 2001 which claims the benefit of Japanese Application 2001-58785 filed Mar. 2, 2001 which claims the benefit of Japanese Application of 2000-160098 filed May 30, 2000.

FIELD OF THE INVENTION

The present invention relates to a method and apparatus for warming-up a fuel cell, which generates electric current utilizing oxygen contained in the air.

PRIOR ART

A fuel cell has recently drawn considerable attention as a power source of an electric vehicle because of its cleanness and excellent energy efficiency. Generally, the air is supplied as an oxidant and the pure hydrogen is supplied as a fuel to the fuel cell so as to generate electric current by an electrochemical reaction of the fuel cell.

Japanese Patent Laid-Open No.58-164157 discloses a fuel cell system having an air circulation pipe to reuse the unused oxygen in the air. In this prior art, the air functions as the oxidant but also as a coolant which is to reduce heat from the fuel cell which has occurred during the electrochemical reaction. The air circulation is controlled by a valve and an air pump according to the temperature of a supply air and an exhaust air so that the temperature of the fuel cell remains in an efficient temperature.

Another prior art U.S. Pat. No. 5,543,238 also discloses a polymer electrolyte membrane fuel cell system having the air circulation pipe. The fuel cell produces water during its electrochemical reaction. In this prior art the air carries the produced water via the air circulation pipe for humidifying the membrane in the fuel cell. The air circulation is controlled by a pump and a controller.

In these prior art disclosed above, the air circulation pipe is disclosed to cool the fuel cell, and to humidify the fuel cell during the operation of the fuel cell. The amount of the circulation air must be controlled during the operation of the fuel cell because the oxygen in the air is used by the electrochemical reaction of the fuel cell so that the concentration of the oxygen is decreased and that lowers the efficiency of the fuel cell.

The polymer electrolyte membrane fuel cell can generate electric current in an efficient manner at a temperature higher than the atmospheric temperature (about 80-90° C.), and cannot generate electric current unless the fuel cell is well warmed. Consequently, it is required to rapidly warm-up the fuel cell at the time of stating the fuel cell. Particularly, when the fuel cell is carried on an electric vehicle, it should be warmed-up more rapidly, because the vehicle is considered to use under low temperature conditions such as cold districts and wintertime.

An object of the present invention is, therefore, to provide a method for warming-up a fuel cell and a fuel cell vehicle which can rapidly warm-up the fuel cell at starting period of the fuel cell.

Another object of the present invention is to provide an apparatus for warming-up a fuel cell and a fuel cell vehicle which can rapidly warm-up the fuel cell at the starting period of the fuel cell.

SUMMARY OF THE INVENTION

According to one aspect of the present invention there is provided: a method for warming up a fuel cell system comprising; a fuel cell which generates electric current due to an electrochemical reaction between hydrogen and oxygen, and which supplies the electric current to a load, an air supply pipe for supplying air to the fuel cell as an oxidant gas, an air exhaust pipe for discharging exhaust air from the fuel cell to an atmosphere, a compressor provided on either of said air supply pipe and said air exhaust pipe, which carries the air and a communication pipe which returns said exhaust air to said air supply pipe, and which communicates said exhaust air pipe with said air supply pipe to form a circulation cycle including said compressor. The method of the present invention comprises: detecting a temperature of the fuel cell, and if the temperature of the fuel cell-is lower than a first prescribed temperature, heating said fuel cell by circulating the air, which has been heated by a heat generated due to adiabatic compression through said compressor prior to supplying the electric current to the load from the fuel cell.

According to another aspect of the present invention, there is provided a method for warming up a fuel cell vehicle comprising; a fuel cell which generates electric current due to an electrochemical reaction between hydrogen and oxygen, and which supplies the electric current to a load, the load includes at least a driving motor which able to drive said fuel cell vehicle, an air supply pipe for supplying air to the fuel cell as an oxidant gas, an air exhaust pipe for discharging exhaust air from the fuel cell to an atmosphere, a compressor provided on either of said air supply pipe and said air exhaust pipe, which carries the air and a communication pipe which returns said exhaust air to said air supply pipe, and which communicates said exhaust air pipe with said air supply pipe to form a circulation cycle including said compressor. The method of the present invention comprises: detecting a temperature of the fuel cell, and if the temperature of the fuel cell is lower than a first prescribed temperature, heating said fuel cell by circulating the air, which has been heated by a heat generated due to adiabatic compression through said compressor prior to supplying the electric current to the driving motor from the fuel cell.

According to still another aspect of the present invention, there is provided a An apparatus for warming up fuel cell system comprising: a fuel cell which generates an electric current due to an electrochemical reaction between hydrogen and oxygen, and which supplies the electric current to a load, an air supply pipe for supplying air to the fuel cell as an oxidant gas, an air exhaust pipe for discharging exhaust air from the fuel cell to an atmosphere, a compressor provided on either of said air supply pipe and said air exhaust pipe, which carries the air and a communication pipe which returns said exhaust air to said air supply pipe, and which communicates said exhaust air pipe with said air supply pipe to form a circulation cycle including said compressor; a thermo-sensor, which detects a temperature of the fuel cell, and a control unit which controls said compressor so that said fuel cell is heated by circulating the air, which has been heated by a heat generated due to adiabatic compression through said compressor prior to supplying the electric current to the load from the fuel cell and if the temperature of the fuel cell detected by the thermo-sensor is lower than a first prescribed temperature.

Also, provided is a fuel cell vehicle comprising a fuel cell which generates electric current due to an electrochemical reaction between hydrogen and oxygen, and which supplies an electric current to a load, the load includes at least a driving motor which able to drive a vehicle, an air supply pipe for supplying air to the fuel cell as an oxidant gas, an air exhaust pipe for discharging exhaust air from the fuel cell to an atmosphere, a compressor provided on either of said air supply pipe and said air exhaust pipe, which carries the air and a communication pipe which returns said exhaust air to said air supply pipe, and which communicates said exhaust air pipe with said air supply pipe to form a circulation cycle including said compressor. The fuel cell vehicle further comprises a thermo-sensor which detects a temperature of the fuel cell, and a control unit which controls said compressor so that said fuel cell is heated by circulating the air, which has been heated by a heat generated due to adiabatic compression through said compressor prior to supplying the electric current to the driving motor from the fuel cell and if the temperature of the fuel cell detected by the thermo sensor is lower than a first prescribed temperature.

Furthermore, the present invention provides a method for warming up a fuel cell vehicle comprising; a fuel cell which generates an electric current due to an electrochemical reaction between hydrogen and oxygen, and which supplies the electric current to a load, the load includes at least an electric motor which able to drive said fuel cell vehicle and an accessory for the fuel cell. The method of the present invention comprises: detecting a temperature of the fuel cell, and if the temperature of the fuel cell is lower than a first prescribed temperature, heating said fuel cell by either a heat generated from the accessory of the fuel cell, or a heat generated by previous power generation of said fuel cell to a prescribed temperature that the fuel cell efficiently generate electric current by the electrochemical reaction, prior to supplying electric current to the driving motor, supplying the electric current from said fuel cell to the driving motor after the temperature of the fuel cell exceeds the prescribed temperature.

DESCRIPTION OF THE PREFERRED EMBODIMENTS

Embodiments of the apparatus for warming-up the fuel cell and the fuel cell vehicle according to the present invention will now be described by referring to the attached drawings.

FIRST EMBODIMENT

The apparatus for warming-up the fuel cell system according to the first embodiment will be described herein below.

Figure 1:
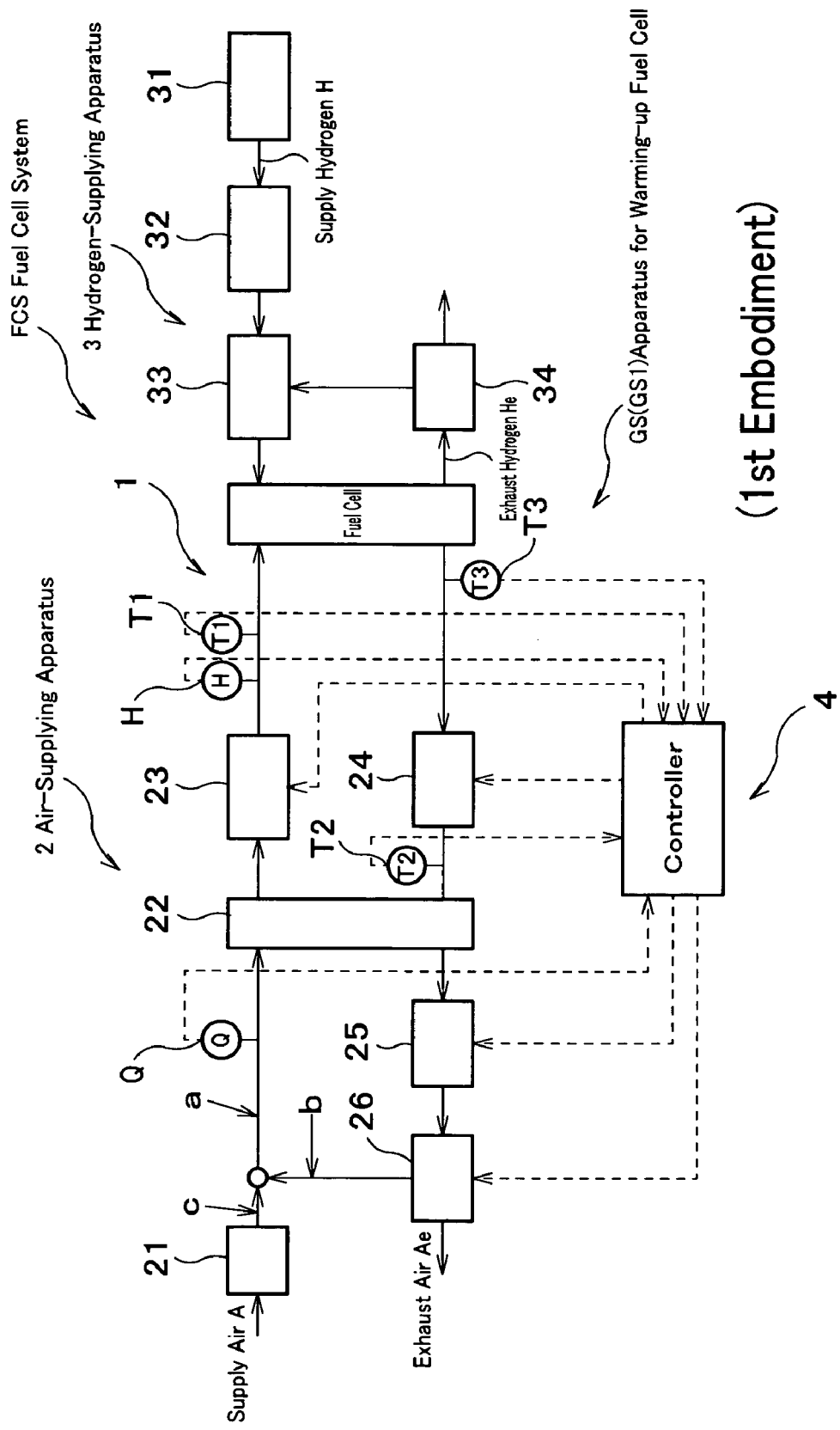
FIG. 1 totally shows a fuel cell system including an apparatus for warming-up a fuel cell according to the present invention.
Figure 2:
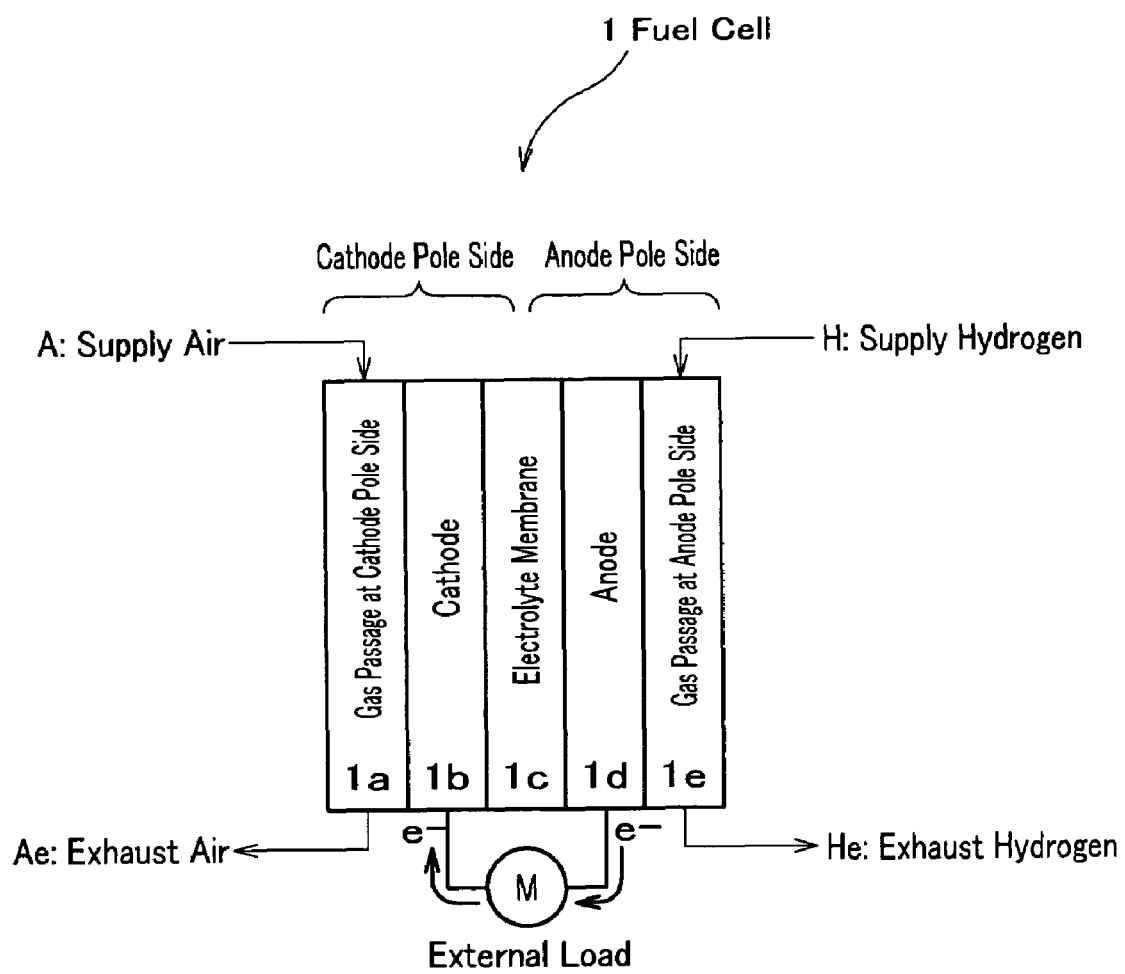
FIG. 2 is a schematic view illustrating the configuration of the fuel cell in FIG. 1.
Figure 3:
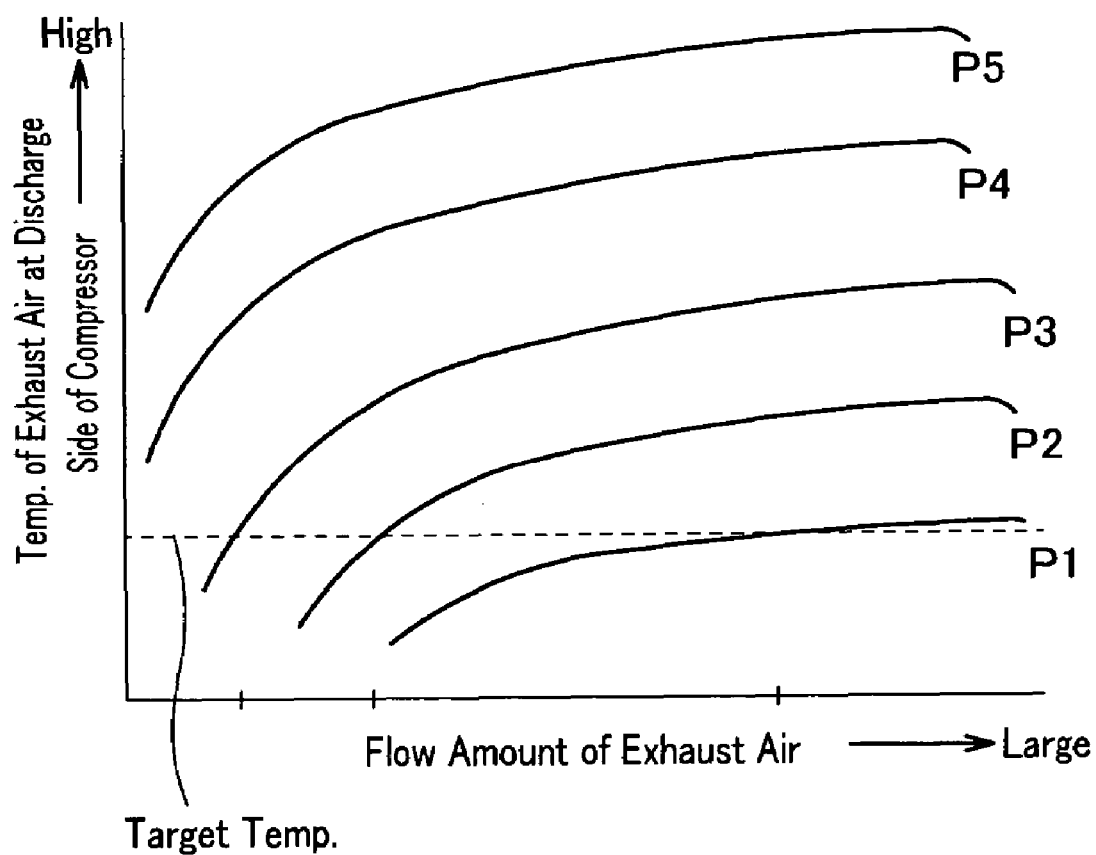
FIG. 3 is a graph showing the temperature-increasing profile in the compressor shown in FIG. 2.
Figure 11:
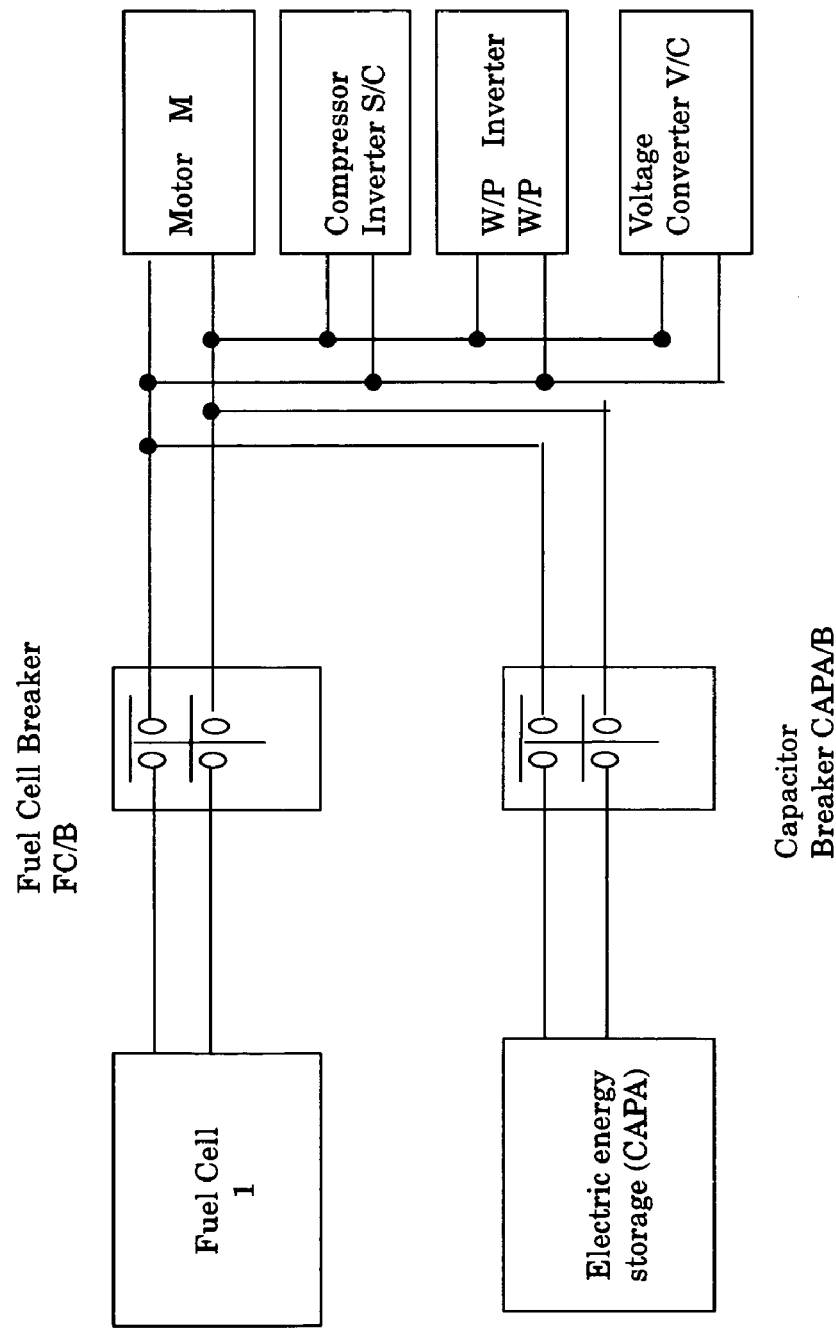
FIG. 11 shows a fuel cell system according to the present invention carried on a vehicle.

In the following explanation which demonstrates the first embodiment, FIGS. 1 to 3 and 11 are used for the reference, wherein FIG. 1 and 11 totally shows a fuel cell system including an apparatus for warming-up a fuel cell according to the present invention; FIG. 2 is a schematic view illustrating the configuration of the fuel cell in FIG. 1; and FIG. 3 is a graph showing the temperature-increasing profile in the compressor shown in FIG. 2.

A fuel cell system FCS shown in FIG. 1 is an electric power generation system based on a fuel cell 1. The fuel cell system FCS is mainly composed of the fuel cell 1, an air-supplying apparatus 2, a hydrogen-supplying apparatus 3, a controller 4, and the like. The apparatus GS (GS1) for warming-up the fuel cell is composed of the air-supplying apparatus 2, and a controller 4. The fuel cell system FCS is carried on a vehicle (fuel cell vehicle).

As shown in FIG. 2, the fuel cell 1 is divided into a cathode side and an anode side across an electrolyte membrane $1c$. Electrodes containing a platinum series catalyst are provided on both sides to form a cathode electrode $1b$ and an anode electrode $1d$, respectively. As the electrolyte membrane $1c$, a solid macromolecular membrane such as a perfluorocarbon sulfonic acid membrane, which is a proton-exchange membrane, is used. The electrolyte membrane $1c$ has a plurality of proton exchanging groups in the molecule thereof, and a low specific resistance not more than 20 $\Omega$-proton at the normal temperature when it has a saturated moisture content, acting as a proton-conductive electrolyte. The catalyst contained in the cathode $1b$ is a catalyst in order to produce oxygen ions from oxygen, and the catalyst contained in the anode $1d$ is a catalyst in order to produce protons from hydrogen.

A cathode side gas passage $1a$ which allows a supply gas A as an oxidant gas for passing therethrough is provided outside the cathode electrode $1b$, while an anode side gas passage $1e$ which allows hydrogen H to be supplied as a fuel gas for passing therethrough is provided outside the anode electrode $1d$. An inlet and outlet of the cathode side gas passage $1a$ are connected to the air-supplying apparatus 2, and an inlet and outlet of the anode side gas passage $1d$ are connected to the hydrogen-supplying apparatus 3. The configuration of the fuel cell 1 shown in FIG. 2 is schematically shown as a single cell, but an actual fuel cell 1 is made up of a fuel cell stack with approximately 200 single cells stacked. Since the fuel cell heats up due to electrochemical reaction during the course of the power generation, the fuel cell 1 has a cooler (not shown) which cools the fuel cell 1.

In the fuel cell 1, when the supply air A is supplied to the cathode side gas passage 1a and the supply hydrogen H is supplied to the anode side gas passage 1e, hydrogen is ionized due to the catalyzation at the anode electrode 1d to produce protons, which then move within the electrolyte membrane 1c to reach the cathode electrode 1b. The protons reaching the cathode electrode 1b are readily reacted with the oxygen ions produced from the oxygen contained in the supply air A to produce water. The supply air A containing the water thus produced is discharged from the outlet at the cathode side of the fuel cell 1 as exhaust air Ae, which contains a large amount of moisture). Electron e⁻ are produced at the anode electrode 1d at the time of ionizing hydrogen, the resulting electrons e− reach the cathode electrode 1b via an external load M such as a driving motor. The fuel cell supplies electric current to the external load.

As shown in FIG. 11, the fuel cell 1 is connected via an fuel cell breaker FC/B, to the loads such as a driving motor M, an inverters for the accessories (such as a compressor inverter S/C, water pump inverter w/p), an air conditioner inverter A/C, and a voltage converter V/C. An electric energy storage capacitor CAPA is provided separately from the fuel cell, and is connected via a high voltage capacitor breaker CAPA/B. The capacitor and the fuel cell are connected to the loads in parallel.

As shown in FIG. 1, the air-supplying apparatus 2 making up the apparatus GS1 for warming-up the fuel cell is composed mainly of an air cleaner 21, a heat exchanger 22, a humidifier 23, a compressor 24, a pressure control sensor 25, a three-way valve 26, an airometer (flow sensor) Q, thermo-sensors $T_1$, $T_2$, and $T_3$, a humidity sensor H, and the like.

The air cleaner 21 is composed of a filer (not shown), and the like, and filtrates the air supplied to the cathode electrode side of the fuel cell 1 (supply air A) thereby remove dusts contained in the supply air A.

The heat exchanger 22 (as an apparatus) is composed of a plate type heat exchanger or a shell and tube type heat exchanger possessing passages at a low temperature fluid side and a high temperature fluid side (not shown), and performs heat exchange between the air compressed through the compressor 24 (exhaust air Ae) and the supply air A. The supply air A is heated through the heat exchanger 22 and then is introduced into the fuel cell 1. The fuel cell 1 is operated at a temperature from about 80 to 90° C. For this reason, the temperature-controlled supply air A controlled to be from 60 to 75° C. is introduced into the fuel cell 1. The temperature control of the supply air A will be described fully later on.

The compressor inverter S/C is connected to the compressor 24 to supply air to the fuel cell as an oxidant.

The humidifier 23, which is one of a carburetor, is composed of Venturi tubes (capillary tubes), a water-storage tank, a siphon which connects the Venturi tubes and the water-storage tank etc. (not shown), the water stored in the water-storage tank is pumped by the Venturi action and is sprayed to humidify the supply air A. Into the siphon tube is inserted a needle which is driven by a stepping motor to control the flow amount of the water flowing through the siphon tube (the needle and the siphon tube making up a needle valve). As described above, the humidification of the supply air A is to humidify the fuel cell 1 thereby preventing the drying of the electrolyte membrane 1c shown in FIG. 2. If the electrolyte membrane 1c is dried, the migration of the protons is inhibited, lowering the efficiency of the fuel cell 1. On the other hand, if the fuel cell 1 is humidified in excess, the cathode side gas passage 1a shown in FIG. 1 and/or diffusion layers (not shown) are soaked in water, leading to decrease in the electromotive power.

The compressor 24 (means for pressing in the exhaust gas) is composed of a super charger (volume type compressor), a motor which drives the super charger (not shown), and the like, and the compressor 24 draws the supply air A which has been used as the oxidant gas in the fuel cell 1, i.e., the exhaust air Ae discharged from the cathode side of the fuel cell 1, and deliveries the exhaust air Ae to the later heat exchanger 22. By drawing the supply air A, the compressor 24 plays role in operating the fuel cell 1 through a negative pressure (pressure not higher than the atmospheric pressure). The compressor also adiabatically compresses the exhaust air Ae to raise the temperature of the exhaust air, whereby the exhaust air Ae having been heated up is used as a heat source for heating the supply air A.

The pressure control valve (pressure controller) 25 is composed of a butterfly valve and a stepping motor (not shown), and the like, and it controls the pressure of the exhaust air Ae out of the compressor (discharge pressure) by decreasing or increasing the opening of the pressure control valve 25. When the opening of the pressure control valve 25 is decreased, the discharge pressure from the compressor 24 is increased and, accordingly, the range of increasing the temperature of the exhaust air Ae is increased. Conversely, when the opening of the pressure control valve 25 is increased, the discharge pressure from the compressor 24 is decreased, and accordingly, the range of increasing the temperature of the exhaust air Ae is decreased.

The pressure control vale 25 makes the exhaust air flowing in a situation where change in enthalpy is small. For this reason, the temperature decrease of the exhaust gas after flown through the pressure control valve 25 is small.

The three-way valve 26 (means for returning the exhaust gas) is composed of a passage switcher driven through electromagnetic force (not shown) and it switches the passage of the exhaust gas Ae to an exhaust position or a returning position. When the three-way valve 26 is set at the exhaust position, the exhaust gas Ae is discharged out of the system, to the atmosphere. On the other hand, when the three-way valve 26 is set at the returning position, the exhaust gas Ae is returned to a the supply air pipe via a communication pipe positioned between the air cleaner 21 and the heat exchanger 22.

When the three-way valve is in return position, the pipes (the supply air pipe, the exhaust air pipe and the communication pipe) form a circulation cycle including compressor 24. The conditions for switching the position of the three-way valve 26 to the exhaust position or the returning position will be described later on.

The airometer Q is composed of a differential pressure type flow meter etc., and it detects the flow amount of the supply air A after flowing through the air cleaner 21 (after joining with the exhaust air Ae) and sends the detected signal to the controller 4.

The thermo-sensor $T_1$ is composed of a thermister etc., and it detects the temperature of the supply gas A at the inlet of the fuel cell 1 at the cathode side, which is sent to the controller 4.

The thermo-sensor $T_2$ is composed of a thermister etc., similar to the thermo-sensor $T_1$, and it detects the temperature of the exhaust air Ae at the outlet of the compressor 24, which is sent to the controller 4.

The thermo-sensor $T_3$ is composed of a thermister etc., similar to the thermo-sensor $T_1$ and $T_2$, and it detects the temperature of the exhaust air Ae at the outlet of the fuel cell 1 of the cathode side, which is sent to the controller 4.

The humidity sensor H is composed of a macromolecular type humidification sensor, etc., and it detects the humidity of the supply gas A at the inlet of the fuel cell 1 at the cathode side, which is sent to the controller 4.

As shown in FIG. 1, the hydrogen-supplying apparatus 3 is composed of a hydrogen gas cylinder 31, a regulator 32, a hydrogen-circulating pump, a three-way valve 34, and the like.

The hydrogen gas cylinder 31 stores the supply hydrogen gas H to be introduced into the anode side of the fuel cell 1. The supply hydrogen H to be stored is pure hydrogen having a pressure of from 15 to 20 MpaG (150-200 kg/cm$^2$ G). It is noted that the hydrogen gas cylinder 31 may be a type having a built-in hydrogen-occlusion alloy which stores hydrogen at a pressure of approximately 1 MpaG (10 kg/cm$^2$ G).

The regulator 32 is composed of a diaphragm, a pressure-adjusting spring (not shown), etc. and is a pressure controller which decreases the pressure of the supply hydrogen stored at a high pressure to a prescribed level so that the supply hydrogen H may be utilized at a constant pressure. Taking the atmospheric pressure as the reference pressure to be introduced into the diaphragm, the regulator 32 can decrease the pressure of the supply hydrogen H stored in the hydrogen gas cylinder 31 to a level near the atmospheric pressure. Taking the pressure of the negative pressure portion of the air-supplying apparatus 2 which is operated at a negative pressure as a reference pressure to be introduced into the diaphragm, the pressure of the supply hydrogen H stored in the hydrogen gas cylinder 31 can be decreased to a pressure near the pressure of the corresponding negative pressure portion. In the first embodiment, since the hydrogen-supplying apparatus 3 is operated at a negative pressure not higher than the atmospheric pressure, the pressure at the intake side of the compressor 2 of the air-supplying apparatus 2 is input as the reference pressure. By operating the hydrogen-supplying apparatus 3 at a negative pressure, the external leakage of the flowing hydrogen can be prevented, which improve the fuel efficiency.

The hydrogen-circulating pump 33 is composed of an ejector (not shown), etc., and it utilize a flow of the supply hydrogen H towards the anode side of the fuel cell 1 to draw the supply hydrogen H having been used in the fuel cell 1, i.e., the exhaust hydrogen He, which is discharged from the anode of the fuel cell 1 and flows through a three-way valve 34, and to circulate it. The reason why the exhaust hydrogen is circulated and used is that the supply hydrogen H is pure hydrogen stored in the hydrogen gas cylinder 31.

The three-way valve 34 is composed of a passage switcher (not shown), etc., and it switches the passage of the exhaust hydrogen He to the discharge position or circulation position. When the three-way valve 34 is switched to the discharge position, the exhaust hydrogen He is discharged out of the system of the hydrogen-supplying apparatus 3. When the three-way valve 34 is switched to the circulation position, the exhaust hydrogen He is introduced into a hydrogen circulation pump 33.

The controller 4 which makes up the apparatus GS1 for warming-up the fuel cell is composed of CPU, memories, I/O interface, A/D converter, bus, etc., (not shown). The controller 4 totally controls the fuel cell system FCS. The controller 4 also controls the flow amount, temperature and the humidity of the supply air A to be supplied to the fuel cell 1. The controller 4 receives the detected signals from sensors Q, $T_1$, $T_2$, and $T_3$ and H. Also, the controller 4 sends the control signals to the humidifier, to the compressor 24, to the pressure control valve 25, and to the three-way valve 26. The control of (1) the flow amount, (2) temperature and (3) the humidity of the supply air A and (4) control for switching the passage will now be described. As described herein below, the controller 4 possesses two modes, i.e., a starting mode and a normal mode. The three-way valve 26 is in the returning position at the starting mode, and in the exhaust position at the normal mode.

(1) With regard to the control of the flow amount, the controller 4 sets a target flow amount of the supply air A to be required through a map etc., on the basis of the output demand signal from means for adjusting output such as an accelerator pedal (not shown). When the target flow amount is increased, the controller 4 produces a control signal so as to increase the discharge amount from the compressor 24 (revolution number of the motor) and send it to the compressor 24. On the other hand, when the target flow amount is decreased, the controller 4 produces a control signal so as to decrease the discharge amount from the compressor 24 (revolution number of the motor) and send it to the compressor 24. At this time, a feed back control is performed so that the deviation between the detected signal from the airometer Q and the target flow amount becomes zero.

(2) With regard to the temperature control, the controller 4 the temperature of the supply air A to be the target temperature ranging from 60° C. (the lower limit of the prescribed temperature) to 75° C. (the upper limit of the prescribed temperature) on the basis of the detected signal from the thermo-sensor $T_1$ by means of the opening of the pressure control valve 25 through the stepping motor. Specifically, when the temperature of the supply air A is or will be increased to be not lower than the target temperature, the controller 4 produces a control signal so as to drive the stepping motor in such a manner as to decrease the opening of the pressure control valve, and send the produced signal. This decreases the discharge amount from the compressor 24, decreasing the temperature of the exhaust gas Ae, which in turn, decreases the heat exchange amount in the heat exchanger 22 to thereby decrease the temperature of the supply air A. On the other hand, when the temperature of the supply air A is or will be decreased to be not higher than the target temperature, the controller 4 produces a control signal so as to drive the stepping motor in such a manner as to increase the opening of the pressure control valve, and send the produced signal. This increases the discharge amount from the compressor 24, increasing the temperature of the exhaust gas Ae, which in turn, increases the heat exchange amount in the heat exchanger 22 to thereby increase the temperature of the supply air A. At this time, a feed back control is performed so that the deviation between the detected signal from the thermo-meter $T_1$ and the target temperature becomes zero. Irrelevant to the opening of the pressure control valve 25, the compressor 24 actuates to supply the supply air A in a target flow amount into the fuel cell 1.

As a fail-safe mechanism, when the detected signal from the thermo-sensor $T_2$ becomes higher than a given level (not lower than 150° C.), in order to protect the compressor 24, etc., the controller 4 produces a control signal for increasing the opening of the pressure control valve 25 and/or a control signal for decreasing the discharge amount from the compressor 24 and send it/them. This decreases the temperature at the discharge side of the compressor 24 to thereby protect the compressor 24.

FIG. 3 shows a relationship between the pressure ratio (P1-P5=discharge pressure/intake pressure) of the compressor 24 and the temperature of the exhaust air Ae (the pressure ratio: P5>P4>P3>P2>P1). As seen from this figure, it can be understood that the temperature of the exhaust air Ae can be increased by increasing the pressure ratio of the compressor 24, whereupon the flow amount of the exhaust air Ae only has little influence. Specifically, it can be understood that the temperature of the exhaust air Ae can be controlled by pressure control valve 25. Here, the target temperature described in FIG. 3 is the minimum target temperature of the exhaust air Ae (discharge gas) at the discharge side of the compressor 24. The normal operation (warming-up) is carried out at a temperature higher than the target temperature.

(3) With regard to the humidity control, the controller 4 controls the humidity of the supply air A to be supplied into the inlet of the fuel cell 1 at the cathode side so as to be a target humidity on the basis of the detected signal from the humidity sensor H by controlling the opening of the needle valve of the humidifier 23 through a stepping motor. Specifically, when the humidity of the supply air is or will be increased to be higher than the target humidity, the controller 4 produces a control signal such as to drive the stepping motor in such a manner as to decrease the opening of the needle valve and send the produced control signal. This decreases the amount of moisture flowing through the needle valve, decreasing the humidity of the supply air A. On the other hand, when the humidity of the supply air is or will be decreased to be higher than the target humidity, the controller 4 produces a control signal such as to drive the stepping motor in such a manner as to increase the opening of the needle valve and send the produced control signal. This increases the amount of moisture flowing through the needle valve, increasing the humidity of the supply air A. At this time, a feedback control is performed so that the deviation between the detected signal from the humidity sensor H and the target humidity becomes zero.

(4) With regard to the control for switching the passage, when the ignition switch of the vehicle is ON to start the fuel cell system FCS, the controller becomes the starting mode. When the controller 4 is in the starting mode, the controller 4 produces a signal so as to switch the three-way valve 26 into the returning position to the three-way valve 26 and send it to the three-way valve 26 (the formation of circulation cycle). As described below, the starting mode is released in such a case that the detected signal from the thermo-sensor T$_3$ exceeds a prescribed level, and the controller 4 is shifted to the normal mode. When being shifted to the normal mode, the controller 4 produces a signal for the three-way valve 26 to be switched into the exhaust position and send the signal to the three-way valve 26. It is possible to configure that when the temperature of the exhaust air Ae discharged from the fuel cell 1 is low, the mode is automatically switched to the starting mode.

Next, one example of the operation of the apparatus GS1 for warming-up the fuel cell according to the first embodiment having being described above will be described by referring to FIG. 4.

Figure 4:
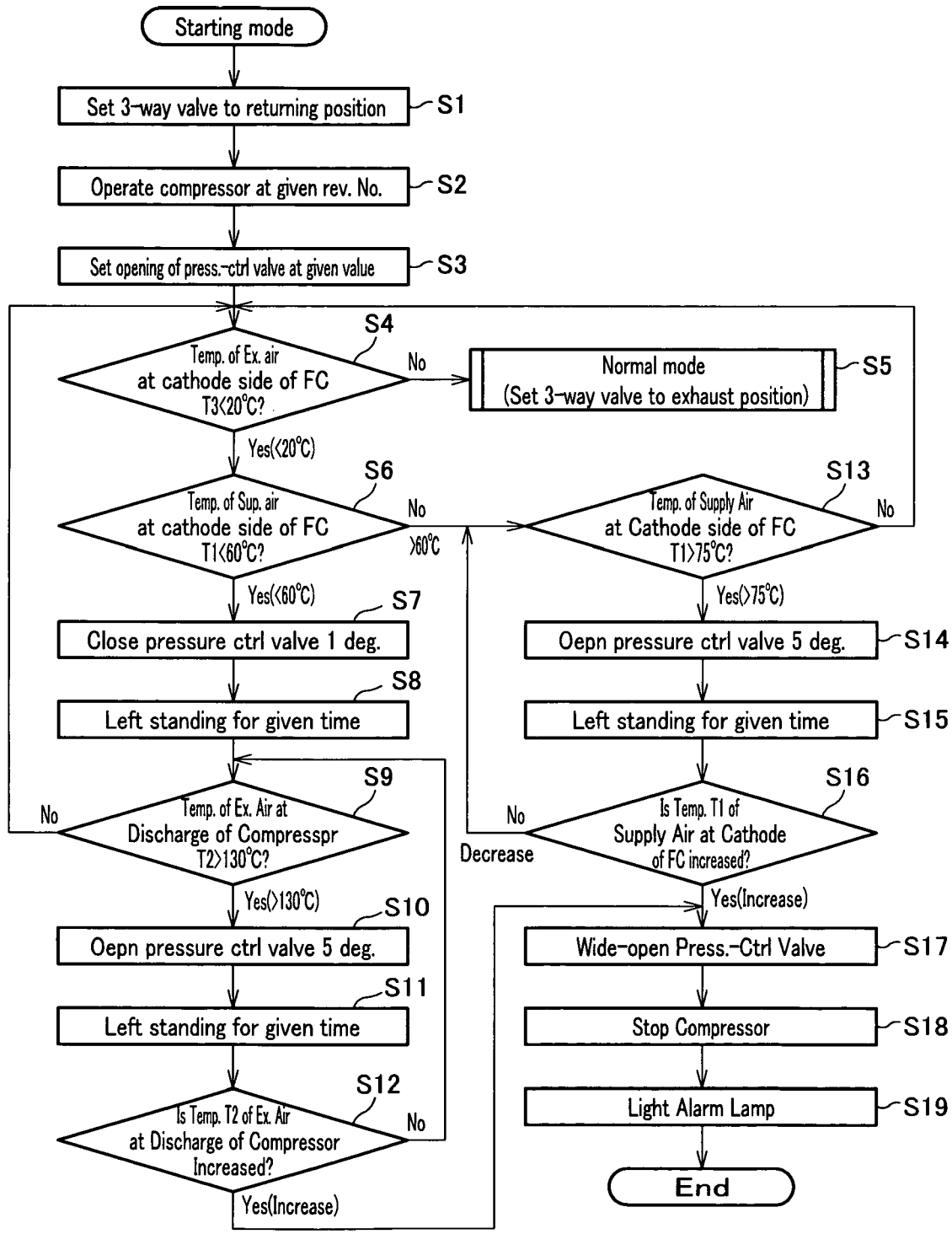
FIG. 4 is a control flow of the apparatus for warming-up the fuel cell according to the first embodiment of the present invention at starting mode.

FIG. 4 is a control flow of the apparatus for warming-up the fuel cell according to the first embodiment of the present invention at starting mode. It is noted that the target temperature of the supply air A at the time of warming-up is from 60° C. (lower limit) to 75° C. (upper limit)

At the starting mode, the controller 4 is switched or positioned to the three-way valve 26 into the returning position to form a circulation cycle (S1). Next, the compressor 24 is operated at a predetermined revolution number (3000 rpm), and the opening of the pressure control valve 25 is set at a prescribed level (S2 and S3). The pressure control valve 25 is set so that the discharge pressure of the compressor 24 is 40 kPaG. This starts the warming-up of the fuel cell 1. In this case, the water is effectively utilized. At this time, the fuel cell does not output electric power. Since the pressure at point C in FIG. 1 is lower than that at point b in FIG. 1, the supply air A from point C does not flow to point A, but the exhaust air Ae from point B flows (pressure of point b>pressure of point c>pressure of point A).

Next, the controller judges whether or not the temperature of the exhaust air Ae at the outlet of the fuel cell 1 of the cathode side is lower than 20° C. (S4). The temperature of the exhaust air Ae represents the temperature of the fuel cell. If the temperature of the exhaust air Ae is not lower than 20° C., the prescribed temperature which the fuel cell efficiently generate electric current by the electrochemical reaction, since the warming-up can be judged to be completed, the controller 4 executes the normal mode (S5). At the time of the execution of the normal mode, the fuel cell 1 starts the power generation, and supplies electric current to the loads, and the three-way valve 26 of the air-supplying apparatus 2 is positioned to the exhaust position. When the power generation is started, oxygen and hydrogen are consumed.

On the other hand, if the temperature of the exhaust air Ae is lower than 20° C., the prescribed temperature which the fuel cell efficiently generate electric current by the electrochemical reaction, in Step 4, the warming-up is continued. In this case, the controller 4 judges whether or not the temperature of the supply air A at the cathode side of the fuel cell 1 is lower than 60° C. (S6). If it is lower than 60° C., the pressure control valve 2 is closed 1 degree (S7), and this state is kept for a given period of time (several seconds) (S8). This increases the temperature of the exhaust air Ae (discharge gas) and that of the supply air A, rapidly warming-up the fuel cell. In step S9, the controller 4 judges whether or not the temperature of the exhaust air Ae at the discharge side of the compressor 24 exceeds 130° C. If it is not higher than 130° C., which is the temperature having no problem, the controller 4 is returned to step S4 to continue the warming-up. If the temperature of the exhaust air Ae at the discharge side of the compressor 24 exceeds 130° C., the pressure control valve 25 is opened 5 degree, and this state is kept for a given period of time (several seconds) (S10 and S1). This decreases the temperature of the exhaust gas Ae at the discharge side of the compressor 24. Preferably, the actual temperature is judged in step S12; if the temperature is decreased, the controller 4 is returned to step 4 to continue the treatment (it is also possible to be returned to step S4).

If the temperature of the exhaust gas Ae at the discharge side of the compressor 24 is still increased (or is not lower than 150° C. (prescribed temperature)), the controller 4 is shifted to step S17 to execute a fail-safe action to wide-open the pressure control valve and to stop the compressor 24 (S17 and S18). In this case, an alarm lamp is turned on to notify the abnormality to the driver, because of the consideration of the abnormality of the pressure control valve 25.

If the temperature of the supply air A at the cathode side of the fuel cell 1 is not lower than 60° C. in Step S6, the controller judges whether or not the temperature of the supply air A at the cathode side of the fuel cell 1 exceeds 75° C., which is the upper limit of the target temperature (S13). If it is lower than 75° C., which is an appropriate temperature, the controller is returned to step S4 to continue the treatment.

On the other hand, if the temperature of the supply air A at the cathode side of the fuel cell 1 exceeds 75° C., the pressure control valve 25 is opened 5 degree, and this state is kept for a prescribed period of time (several seconds) (S14 and S15). This decreases the temperature of the exhaust air Ae at the discharge side of the compressor 24 and the temperature of the supply air A at the cathode side of the fuel cell 1. Preferably, the actual temperature is judged in step S12; if the temperature is decreased, the controller 4 is returned to step 4 to continue the treatment (it is also possible to be returned to step S4). If the temperature of the exhaust gas Ae at the discharge side of the compressor 24 is still increased (or is not lower than 150° C. (prescribed temperature)), in which case the mechanical abnormality can be considered as described above, the fail-safe action is executed to wide-open the pressure control valve and to stop the compressor 24 (S17 and S18). In this case, an alarm lamp is turned on to notify the abnormality to the driver. When the pressure control valve 25 is wide-opened, the temperature of the exhaust air Ae is decreased even in the case where the compressor does not stopped.

As described above, by switching the three-way valve 26 from the starting mode to the normal mode or vice versa and by returning the exhaust air Ae to the fuel cell 1 as the supply air A again, the heat generated by the adiabatic compression of the compressor can be used without wasting it to thereby warms-up the fuel cell. Also, the moisture stored in the interior of the fuel cell 1 can be effectively utilized. While means for spraying water is utilized as the humidifier 23 described in this embodiment, it is also possible to employ means for utilizing a water-permeable hollow fiber membrane. Also, although the description is omitted, the hydrogen-supplying apparatus may be configured to carry out the temperature control and humidity control.

SECOND EMBODIMENT

Next, an apparatus for warming-up the fuel cell according to the second embodiment of the present invention will now be described. Elements, parts, and the like identified with those of the first embodiment have the same numerals or symbols and their descriptions will be omitted.

Figure 5:
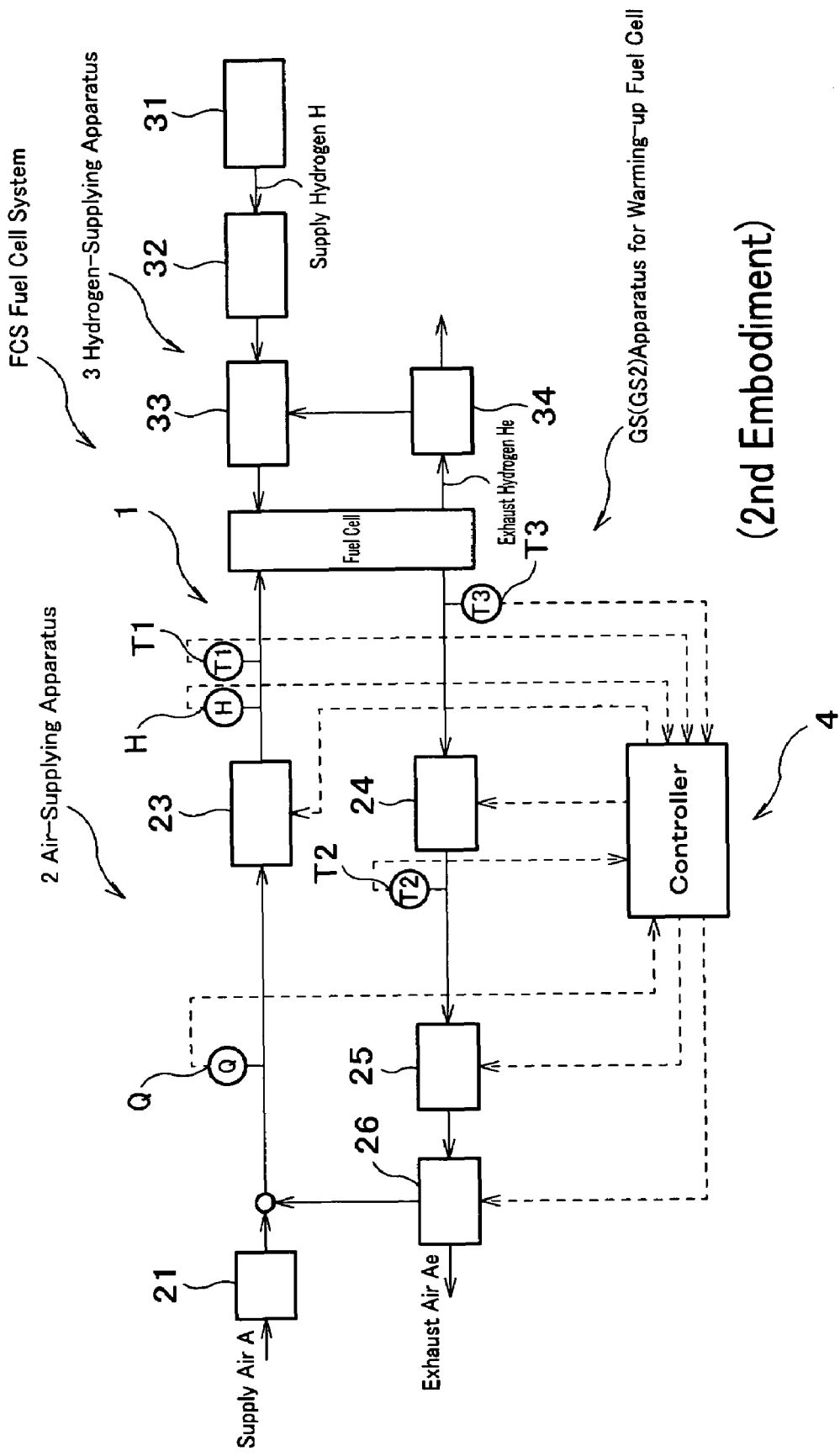
FIG. 5 totally shows a fuel cell system including an apparatus for warming-up a fuel cell according to the second embodiment of the present invention.

FIG. 5 totally shows a fuel cell system including an apparatus for warming-up a fuel cell according to the second embodiment of the present invention.

As shown in FIG. 5, the apparatus GS2 for warming-up a fuel cell according to the second embodiment is configured that no heat exchanger is provided (other portions are the same as those of the first embodiment). In this configuration, the heat generated by the adiabatic compression of the compressor can be used without wasting it to thereby warms-up the fuel cell, and the moisture stored in the interior of the fuel cell 1 can be effectively utilized similar to the first embodiment. A heat exchanger may be provided downstream the three-way valve 26 (discharge side) to carry out heat exchange between the exhaust air Ae and the supply air A at the normal mode.

THIRD EMBODIMENT

Next, an apparatus for warming-up the fuel cell according to the third embodiment of the present invention will now be described. Elements, parts, and the like identified with those of the first embodiment have the same numerals or symbols and their descriptions will be omitted.

Figure 6:
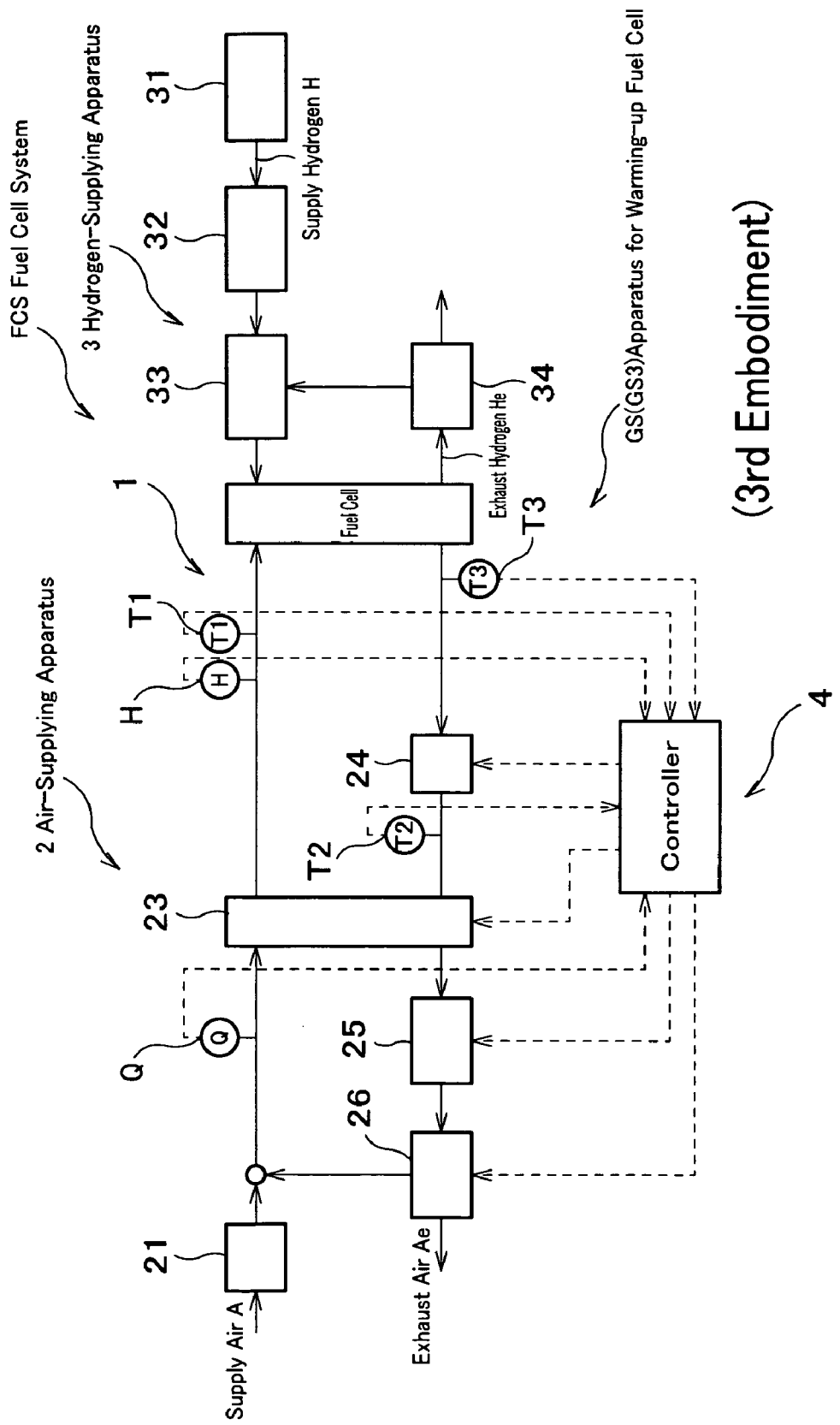
FIG. 6 totally shows a fuel cell system including an apparatus for warming-up a fuel cell according to the third embodiment of the present invention.

FIG. 6 totally shows a fuel cell system including an apparatus for warming-up a fuel cell according to the third embodiment of the present invention.

In an apparatus GS3 for warming-up the fuel cell according to the third embodiment, a water-permeable type humidifier utilizing hollow fiber membrane (not shown) is used as the humidifier 23. The hollow fiber membrane comprises hollow fibers each having a hollow passage, a diameter ranging from 1 to 2 mm and a length of several ten cm. The humidifier 23 is composed of two hollow fiber membrane modules each accommodated within a hollow container, each module comprising a bundle of several thousands of hollow fibers, piping which connects these two hollow fiber membrane modules in parallel, switchers (switching means) for switching these two hollow fiber membrane modules depending upon the flow amount and the humidity of the supply air, such as an electromagnetic valve and a controller for the electromagnetic valve (all being not shown). In this embodiment, the controller for the electromagnetic valve is included in the controller 4.

A packing ratio of the hollow fiber membrane in each hollow fiber membrane module is from 40 to 60% relative to the cross-section of the hollow container. The hollow fiber membrane module is configured so that the exhaust air Ae flows from one end of the hollow passage and is discharged from another end. Also, the hollow fiber membrane module is configured so that the supply air A flows through the gaps among the hollow fibers and is then discharged. Specifically, the hollow fiber membrane module is configured not so as to mix the supply air A with the exhaust air Ae. On the other hand, the hollow fiber membrane module possesses a plurality of capillary tubes from its internal surface to the external surface each having a diameter of several nm. In the capillary tubes, the vapor pressure is decreased, easily resulting in condensation of the moisture. The condensed moisture is drawn out due to the capillary phenomenon and is permeated through the hollow fiber membrane. Consequently, when the exhaust air Ae containing a large amount of moisture produced in the fuel cell 1 flows through the hollow passage, the moisture is condensed on the internal surface of the hollow passage, and the condensed moisture humidifies the supply air A which is relatively dried and flows through the gaps among the hollow fibers. It is also possible that the supply air A flows through the hollow passage side and the exhaust air Ae flows through the gaps among the hollow fibers.

The humidifier 23 is configured so that when the flow amount of the supply air is small, the switcher switches the hollow fiber membrane modules so as to only use one hollow fiber membrane module, and when the flow amount of the supply air is large, the switcher switches the hollow fiber membrane modules so as to use both hollow fiber membrane modules. The switching of the hollow fiber membrane module is due to the humidification characteristic of the hollow fiber membrane module that the humidification performance of the hollow fiber membrane module is decreased if the follow amount of the supply air A and that of the exhaust air Ae are too small or too large. The timing for switching the hollow fiber membrane modules or such is decided by the detected signal from the airmometer Q and the detected signal from the humidity sensor H.

The humidifier 23 utilizing the hollow fiber membrane modules also serves as a heat exchanger which exchanges the heat possessed by the supply air A and that possessed by the exhaust air Ae. Consequently, unlike the first embodiment, the apparatus for warming-up the fuel cell according to this embodiment has no separate heat exchanger.

The apparatus GS3 for warming-up the fuel cell according to the third embodiment having the same configurations as those of the first embodiment, except for the portion of the heat exchanger and the humidifier can rapidly warm-up the fuel cell only in a simple configuration where three-way valve 26 is switched. In the apparatus GS3 for warming-up the fuel cell according to the third embodiment, the moisture stored in the interior of the fuel cell 1 can be effectively utilized and, thus, no or little water for storing water for humidification is required to be stored. Also, the humidification of the supply air A can be carried out in a uniform manner.

FOURTH EMBODIMENT

Next, an apparatus for warming-up the fuel cell according to the fourth embodiment of the present invention will now be described. Elements, parts, and the like identified with those of the first embodiment have the same numerals or symbols and their descriptions will be omitted.

Figure 7:
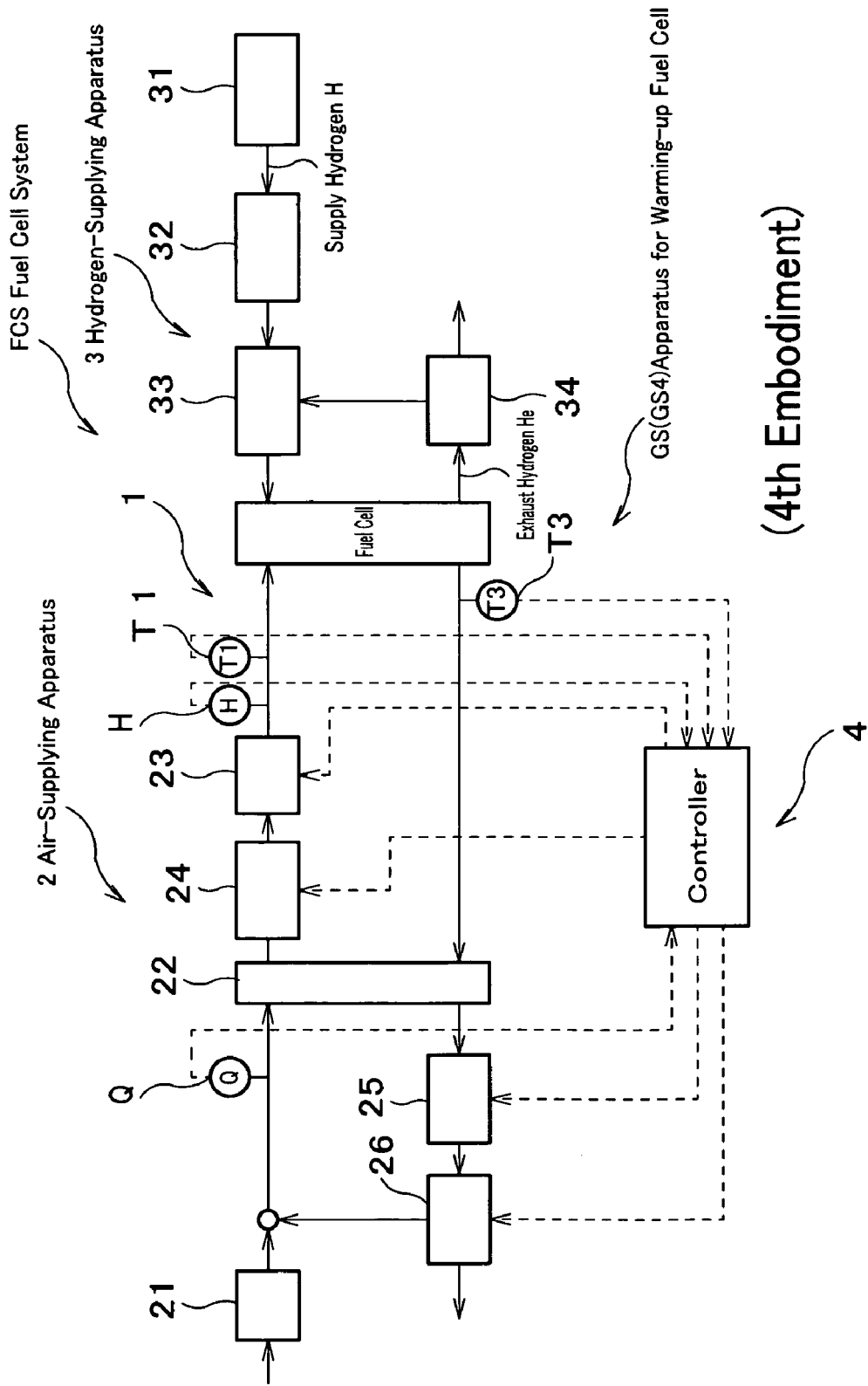
FIG. 7 totally shows a fuel cell system including an apparatus for warming-up a fuel cell according to the fourth embodiment of the present invention.

FIG. 7 totally shows a fuel cell system including an apparatus for warming-up a fuel cell according to the fourth embodiment of the present invention.

In the apparatus GS4 for warming-up the fuel cell according to the fourth embodiment, the compressor 24 is provided between an outlet of the supply air A in the heat exchanger 24 and the humidifier 23. In this configuration, the supply air A introduced via the air cleaner 21 is supplied into the fuel cell 1 via the compressor 24. While the supply air A is adiabatically compressed in the compressor 24 to be pressed into the fuel cell 1, the supply air A is heated during the course of the adiabatic compression to be heated supply air AH. Consequently, the heated supply air AH is supplied into the fuel cell 1, which is contributed to the warming-up of the fuel cell 1.

Similar to the first embodiment, since the three-way valve 26 is positioned to the returning position at starting the fuel cell 1, the heated supply air AH, which has been supplied into the fuel cell 1 for the purpose of warming-up the fuel cell 1, is discharged from the fuel cell 1 to be heated exhaust air AeH, which is then pressed into the supply side of the compressor 24. Although the heat is taken when the fuel cell 1 is warmed-up, the heated exhaust air AeH supplied into the fuel cell 1 has a calorie higher than that possessed by the atmosphere. By returning the heated exhaust air AeH having a calorie higher than that possessed by the atmosphere, the fuel cell 1 can be warmed-up in a much more rapid manner.

After the completion of warming-up the fuel cell 1, the three-way valve 26 is switched into the exhaust position and the normal operation is carried out.

Figure 8:
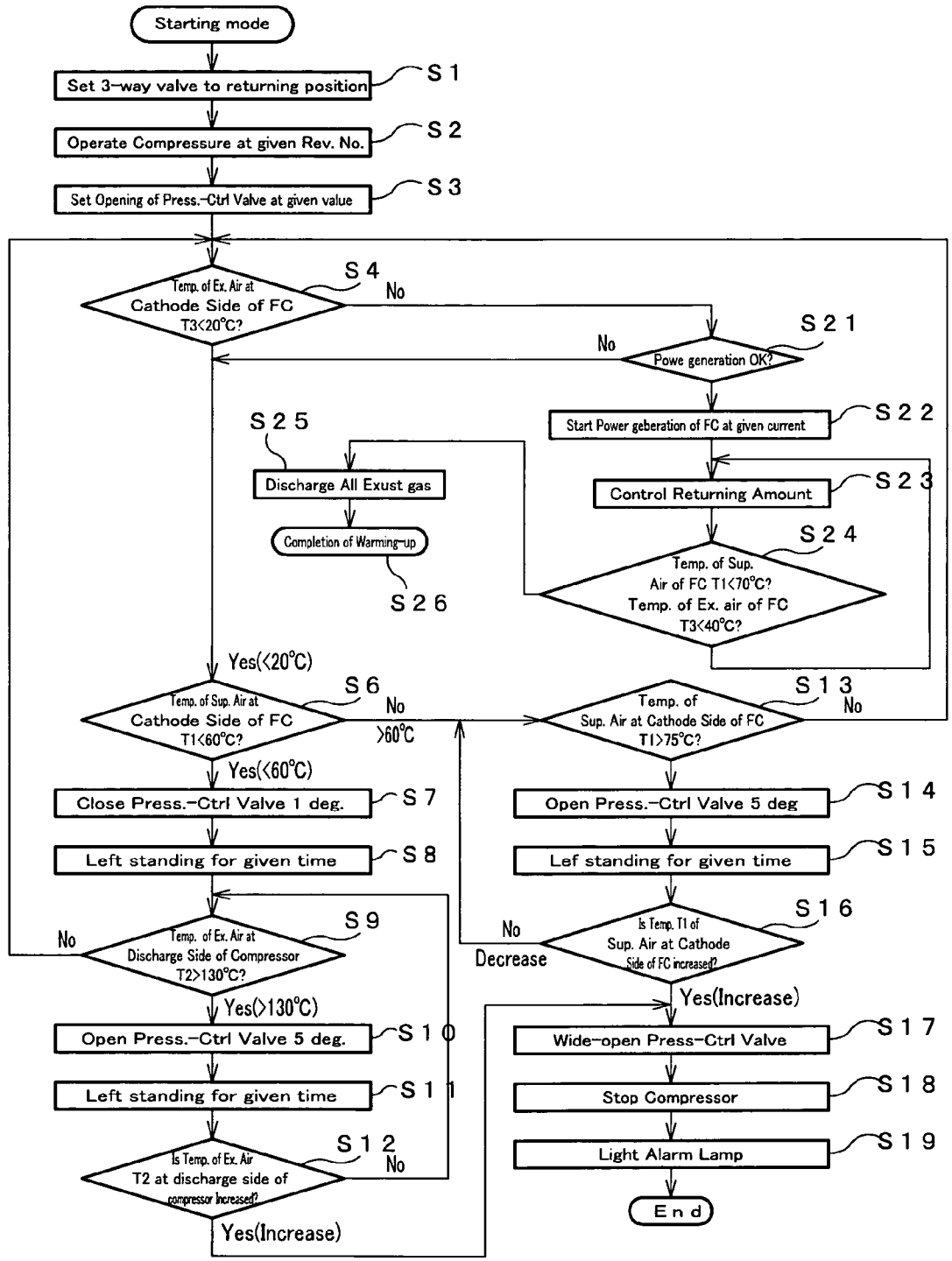
FIG. 8 is a control flow of the apparatus for warming-up the fuel cell according to the fourth embodiment of the present invention at starting mode.

Next, one example of the operation of the apparatus GS4 for warming-up the fuel cell according to the fourth embodiment having being described above will be described by referring to FIG. 8 (also see FIG. 7, as occasion demands). Since this operation has the same portions as those in the case of the starting mode in the first embodiment, the detailed description thereof will be omitted.

At the starting mode, the three-way valve is positioned into the returning position (S1), and the compressor is operated at a given revolution number (S2). Subsequently, the opening of the pressure valve 25 is set at a prescribed level (S3), and the controller judges whether or not the temperature $T_3$ of the exhaust air at the cathode side of the fuel cell 1 (heated exhaust air AeH) is lower than 20° C. (S1). These steps are the same as those of the starting mode of the first embodiment. Since the fuel cell has not yet generated electric power, power for driving the compressor 24 should be required. This power can be taken, for example, from a capacitor or a battery (not shown). If the temperature of the heated exhaust air AeH is judged to be lower than 20° C., the controller 4 executes steps from step 6 to step 19, as in the first embodiment.

On the other hand, if the temperature of the heated exhaust air AeH is judged to be not lower than 20° C., the prescribed temperature which the fuel cell efficiently generate electric current by the electrochemical reaction, the controller 4 is shifted to the normal mode and judges whether or not the fuel cell 1 is ready for power generation (S21). If the fuel cell 1 is judged to be not ready for power generation, the controller 4 is returned to step 6, and then repeats the steps from S6 to S19 as in the first embodiment. If the fuel cell 1 is judged to be ready for power generation, the fuel cell 1 starts power generation at a prescribed current (S22). The power generation at this time is carried out only at a low current because the fuel cell 1 has not yet been warmed-up. Specifically, the power generation at this time is regarded to be previous power generation, and is not regarded to be the normal power generation. The description on the difference between the power generation and the previous power generation will be described later on based on FIG. 12A and FIG. 12B.

When the previous power generation at a low current is started, the fuel cell is heated by itself due to the heat generated by the power generation, which also helps the warming-up of the fuel cell. The amount of returning the heated exhaust air AeH is controlled not so as to supply an excess amount of the heated exhaust air AeH into the compressor 24 to decrease the amount of oxygen of the heated supply air AH supplied into the fuel cell 1 (S23). At this time, according to decrease in the amount of returning the heated exhaust air AeH, or according to oxygen decrease in the circulation cycle, the fresh air is taken to replenish oxygen. In the former case, the three-way valve serving as the means for returning the exhaust gas is controlled to discharge a part of the heated exhaust gas. In the later case, a part of the heated exhaust gas is discharged out of the circulation cycle.

Subsequently, the temperature $T_1$ of the heated supply air AH to be supplied to the fuel cell and the temperature $T_2$ of the heated exhaust air AeH discharged from the fuel cell 1 are detected. Two conditions, i.e., whether or not the temperature $T_1$ of the heated supply air AH is less than 70° C., and whether or not the temperature $T_2$ of the heated exhaust air AeH is less than 40° C., are judged (S24). If both conditions are not satisfied, the controller 4 judges that the warming-up has not yet been completed to return step 23. If any one of both conditions is satisfied, the three-way valve 26 is positioned to the exhaust position to discharge all of the heated exhaust gas (S25). Then, the warming-up is completed (S26) and, thereafter, the power generation of the fuel cell 1 is started.

If the temperature $T_3$ f the heated exhaust air AeH from the fuel cell 1 is less than 20° C. at the starting mode, the starting mode is maintained to exhibit the effect similar to the first embodiment. When the temperature $T_3$ f the heated exhaust air AeH from the fuel cell 1 becomes 20° C. to be shifted to the normal mode, formal power generation is not carried out until the warming-up of the fuel cell is completed and previous power generation is only carried out. Since the formal power generation is started after the completion of the warming-up, the warming-up of the fuel cell 1 can be effectively carried out, and the power generation of the fuel cell 1 can be carried out in a suitable manner.

In this example, the heat exchanger is provided in order to carry out heat exchange between the heated exhaust air AeH and the heated supply air AH. This decreases the returning amount corresponding to the amount of oxygen which is decreased according to the power generation of the fuel cell and, thus, only the calorie possessed by the exhaust gas can be transmitted. Accordingly, the configuration difficult to discharge the heat can be made up.

FIFTH EMBODIMENT

Next, an apparatus for warming-up the fuel cell according to the fifth embodiment of the present invention will now be described. Elements, parts, and the like identified with those of the first to fourth embodiments have the same numerals or symbols and their descriptions will be omitted.

Figure 9:
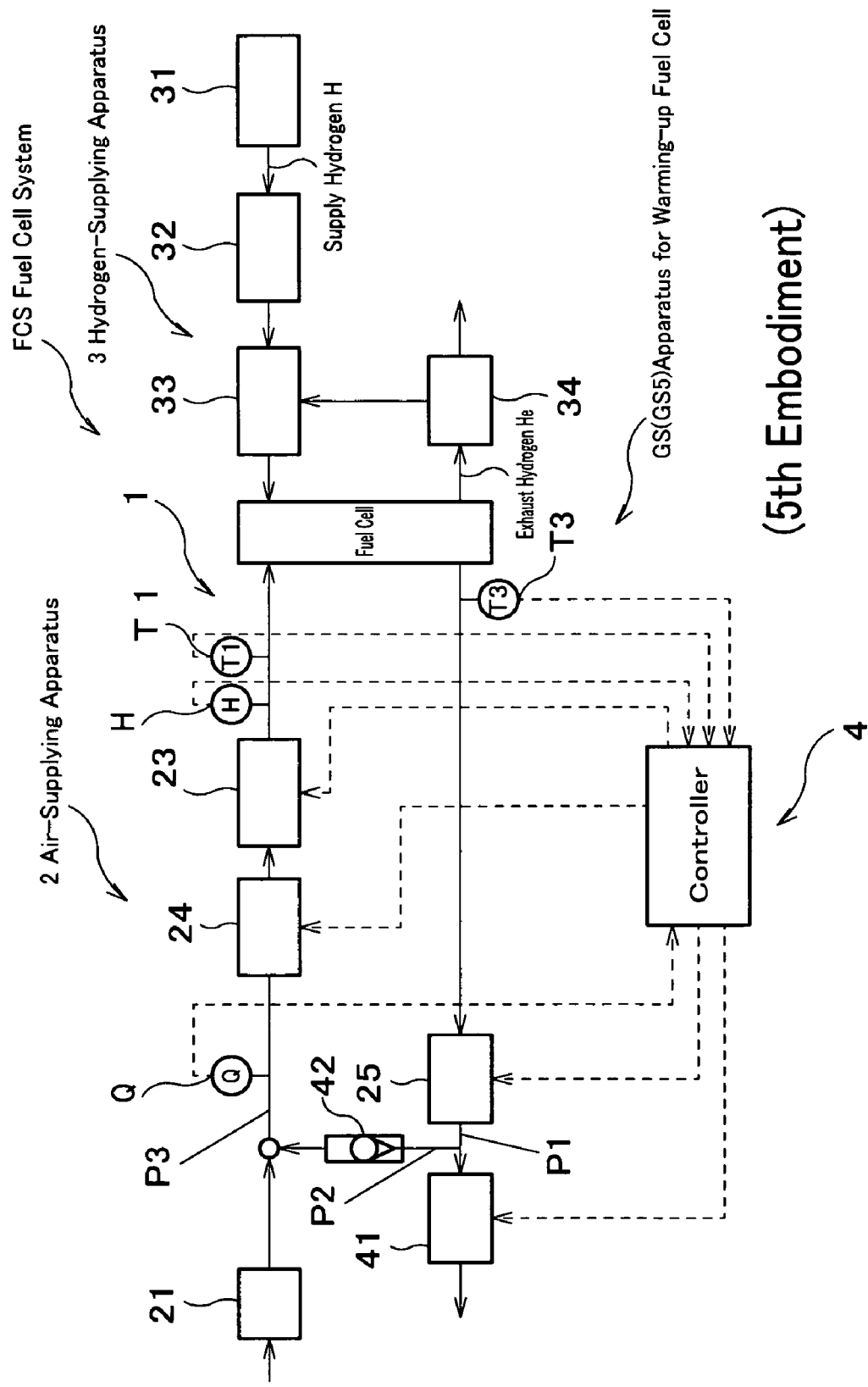
FIG. 9 totally shows a fuel cell system including an apparatus for warming-up a fuel cell according to the fifth embodiment of the present invention.

FIG. 9 totally shows a fuel cell system including an apparatus for warming-up a fuel cell according to the fifth embodiment of the present invention.

As shown in FIG. 9, the apparatus GS5 for warming-up the fuel cell according to the fifth embodiment has no heat exchanger 22 and a flow amount control valve 41 instead of the three-way valve 26 in comparison with the apparatus according to the fourth embodiment. A branch pipe P2 is provided on the pipe P1 between the pressure control valve 25 and the flow amount control valve 41, and connected to a pipe 3 between the airometer Q and the compressor 24. A check valve 42 is provided on the pipe p3.

In this configuration, when the fuel cell 1 is warmed-up, the check valve 42 can be opened to return the heated exhaust air AeH containing a large amount of heat discharged from the fuel cell 1 to the compressor 24. When the check valve 42 is left opening after starting the initiation of the power generation of the fuel cell 1, the heated exhaust air AeH is introduced into the compressor 24. For this reason, at the time which the fuel cell 1 dose not start the power generation at the time of starting the fuel cell 1 as well as at the time after the fuel cell 1 starts power generation, this can be contributed to rapid warming-up of the fuel cell 1. Since the flow amount of the heated exhaust air AeH can be controlled by means of the flow amount control valve 41, the temperature $T_1$ of the heated supply air Ah at the inlet of the fuel cell 1 can be restricted not to exceed the upper limit. Consequently, the fuel cell 1 can be rapidly warmed-up at a temperature within the range not exceeding the upper limit of the temperature $T_1$ of the heated supply air Ah at the inlet of the fuel cell 1.

SIXTH EMBODIMENT

Next, an apparatus for warming-up the fuel cell according to the sixth embodiment of the present invention will now be described. Elements, parts, and the like identified with those of the first to fifth embodiments have the same numerals or symbols and their descriptions will be omitted.

Figure 10:
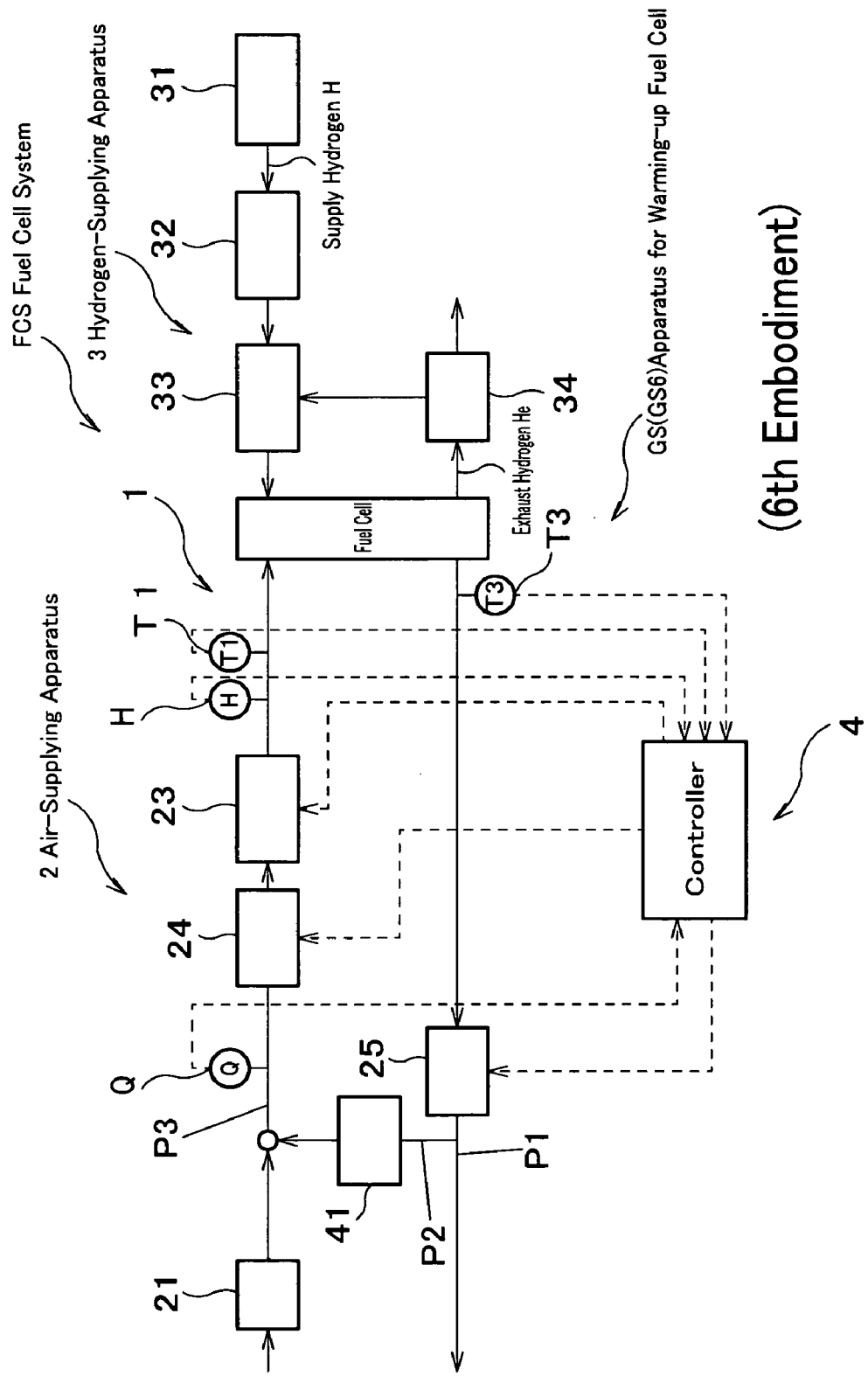
FIG. 10 totally shows a fuel cell system including an apparatus for warming-up a fuel cell according to the sixth embodiment of the present invention.

FIG. 10 totally shows a fuel cell system including an apparatus for warming-up a fuel cell according to the sixth embodiment of the present invention.

The apparatus GS6 for warming-up the fuel cell according to the sixth embodiment has the flow amount control valve 41 provided on the branched pipe P2 and no device provided on the pipe P1 in comparison with the apparatus according to the fifth embodiment.

Figure 12:
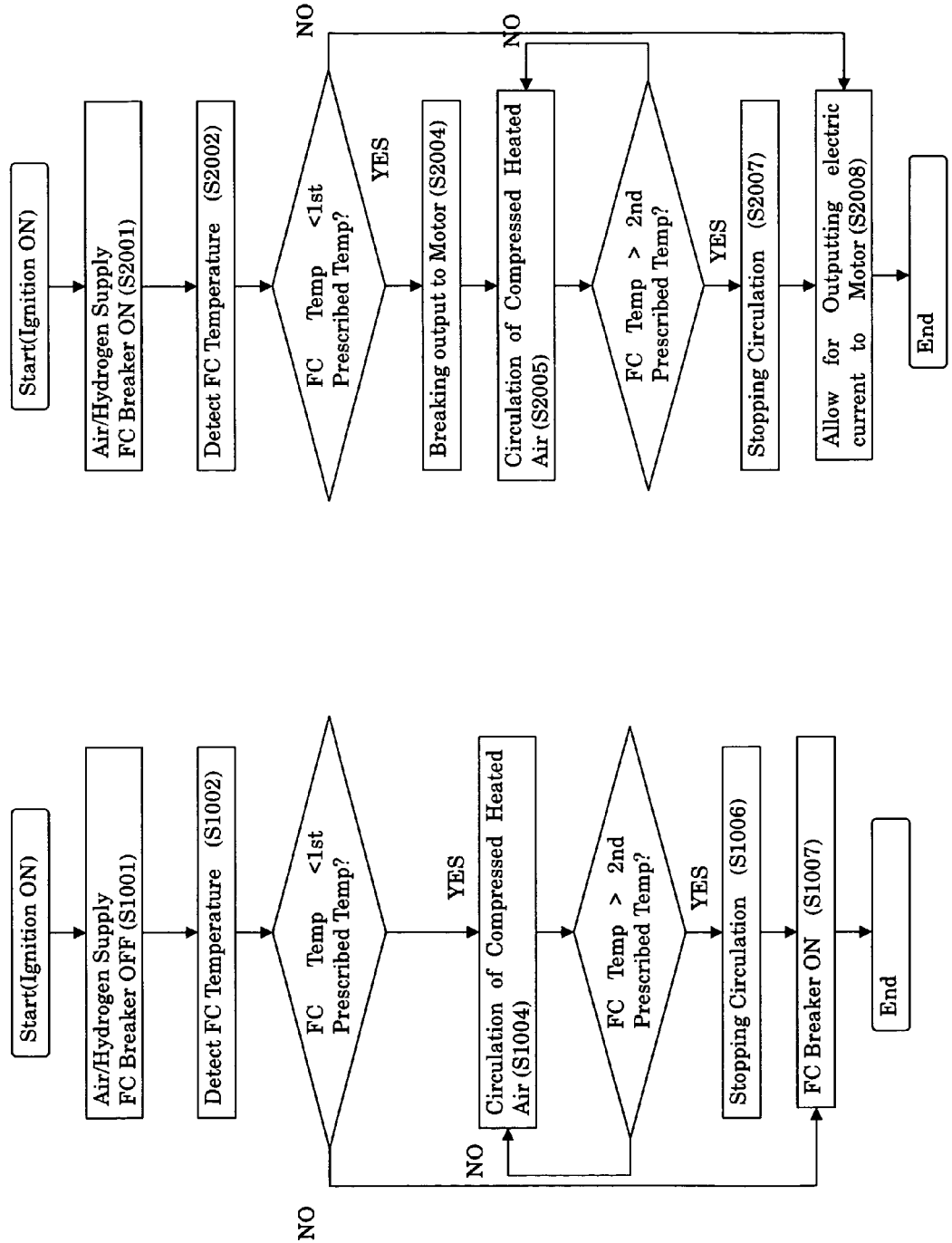
FIG. 12 shows flow before starting power generation of the fuel cell and flow of previous power generation of the fuel cell.

In this configuration, the amount of the heated exhaust air AeH to be returned to the compressor 24 can be controlled by the flow amount control valve 41 provided on the branched pipe 24. Consequently, as in the fifth embodiment, at the time which the fuel cell 1 dose not start the power generation at the time of starting the fuel cell 1 as well as at the time after the fuel cell 1 starts power generation, this can be contributed to rapid warming-up of the fuel cell 1. Since the flow amount of the heated exhaust air AeH can be controlled by means of the flow amount control valve 41, the temperature $T_1$ of the heated supply air Ah at the inlet of the fuel cell 1 can be restricted not to exceed the upper limit. Consequently, the fuel cell 1 can be rapidly warmed-up at a temperature within the range not exceeding the upper limit of the temperature $T_1$ of the heated supply air Ah at the inlet of the fuel cell 1. (Before Power Generation: FIG. 12A)

FIG. 12A shows a flow chart which applies to any of the fuel cell systems disclosed above and is to make the invention more easily to understand. Elements identified with those of the first to sixth embodiment have the same numerals or symbols and the descriptions are omitted.

In the case of the fuel cell 1 carried on the vehicle, first the ignition switch (not shown) of the vehicle is turned on. In this case, the fuel cell breaker FC/B is in a situation of disconnecting the fuel cell to any of the loads such as the driving motor M, and other loads such as inverters for the accessories. (See FIG. 11 and more descriptions in the first embodiment) The air is supplied to the cathode side of the fuel cell through the compressor driven by supplying electric current from the capacitor (not from the fuel cell). Also the hydrogen is supplied to the anode of the fuel cell. (Supply air and hydrogen, FC Breaker OFF: S1001).

Next, the temperature of the fuel cell 1 is detected (S1002) as in the foregoing embodiments to determine whether or not the temperature of the fuel cell (e.g. the temperature of the exhaust gas) is lower than a first prescribed temperature (for example, the temperature is lower than 20° C.). If the temperature is lower than the first prescribed temperature (S1003 YES), the air circulation cycle is formed, for example, switching the three-way valve 26 as in the first embodiment to circulate air, which is compressed and heated through adiabatic compression by the compressor 24 to warm up the fuel cell 1 (S1004).

Conversely, if the temperature is not lower than the first prescribed temperature (S1003: NO), the step is directly shifted to S1007 to allow fuel cell to output the electric current to the loads. (Fuel cell Breaker FC/B ON: S1007)

After time elapse of a predetermined period of time, the temperature is detected and similarly determined whether or not the detected temperature (fuel cell temperature) is higher than a second prescribed temperature, the prescribed temperature which the fuel cell efficiently generate electric current by the electrochemical reaction. In the first to sixth embodiment the first and the second prescribed temperature are the same, but preferably the second prescribed temperature should be higher than the first prescribed temperature.

If the detected temperature is lower than the second prescribed temperature (S1005: NO), the step is shifted again to S1004 to continue the warming-up within the circulation cycle.

On the other hand, if the fuel cell is of a temperature higher than the second prescribed temperature in S1005, (S1005: YES), the circulation of the hot compressed air within the fuel cell is stopped (for example, returning the three-way valve 26 into the original position in FIG. 1) to complete the warming-up because the fuel cell 1 is well warmed up for the electrochemical reaction.

After the circulation is stopped the fuel cell breaker FC/B becomes ON to allow fuel cell to output the electric current to the loads. (S1007)

In this configuration, if the temperature of the fuel cell 1 is lower than the first prescribed temperature at the starting period of the fuel cell, the supply air is circulated in the circulation cycle, which is formed by the supply pipe, the exhaust pipe, the connection pipe and the compressor 24. During the air circulation (S1004) the air is heated by an adiabatic compression by the compressor 24 and the heated air warms up the fuel cell 1 until the temperature of the fuel cell 1 exceeds the prescribed temperature. The heated air will not be wasted since the three-way valve is in a return position, which would rapidly warms-up the fuel cell. The compressor 24 itself also generates heat during the compression of the air, which also assists the rapid warm-up of the fuel cell.

Since the fuel cell 1 is disconnected to the loads until the temperature of the fuel cell 1 exceeds prescribed temperature, (S1001) the fuel cell is avoided from generating electric current in a cold electrochemical reaction condition which could cause a fatal damage to the fuel cell. Again, the fuel cell is not in a power generation during the course of the warm-up. The prescribed temperature should be the temperature which the fuel cell efficiently generate electric current by the electrochemical reaction, such as 20° C. in the first to sixth embodiment. The prescribed temperature could be established depending on the types of the fuel cell.

Previous Power Generation

FIG. 12B shows a flow chart which applies to any of the fuel cell systems disclosed above and is to make the invention more easily to understand. Elements identified with those of the first to sixth embodiment have the same numerals or symbols and the descriptions are omitted.

First the ignition switch (not shown) of the vehicle is turned on. At this time, the fuel cell breaker is in the state of being connected to the loads. The air is supplied to the cathode of the fuel cell 1 through the compressor driven by supplying electric current from the capacitor and/or from the fuel cell. Also the hydrogen is supplied to the anode of the fuel cell. (Supply air and hydrogen, FC Breaker ON: S2001).

Next, the temperature of the fuel cell is detected (S2002) as in the foregoing embodiments to determine whether or not the temperature of the fuel cell (e.g. the temperature of the exhaust gas) is lower than a first given temperature (for example, the temperature is lower than 20° C.). If the temperature is lower than the first given temperature (S2003 YES), the outputting of the electric current from the fuel cell 1 to the driving motor M is disconnected (S2004), and the air circulation cycle is formed, for example, switching the three-way valve 26 as in the first embodiment to circulate air, which is compressed and heated through adiabatic compression by the compressor to warm up the fuel cell (S2005). The electric current from the fuel cell to the motor is disconnected by, for example, changing the demand current of the driving motor to zero.

Conversely, if the temperature is not lower than the first given temperature (S2003: NO), the step is directly shifted to S1008 to allow for outputting the electric current to the driving motor.

After time elapse of a predetermined period of time, the temperature is detected and similarly determined whether or not the detected temperature (fuel cell temperature) is higher than a second prescribed temperature, the prescribed temperature which the fuel cell efficiently generate electric current by the electrochemical reaction. In the first to sixth embodiment the first and the second prescribed temperature are the same, but preferably the second prescribed temperature should be higher than the first prescribed temperature. If the detected temperature is lower than the second prescribed temperature (S2006: NO), the step is shifted again to S2005 to continue the warming-up within the circulation cycle.

On the other hand, if the fuel cell 1 is of a temperature higher than the second prescribed temperature in S2006, (S2006:YES), the circulation of the hot air within the fuel cell 1 is stopped (for example, returning the three-way valve into the original position in FIG. 1) to complete the warming-up. (S2007)

After the circulation is stopped, fuel cell is allowed to output the electric current to the electric motor. (S2008)

In this configuration, if the temperature of the fuel cell 1 is lower than the first prescribed temperature at the starting period of the fuel cell, the supply air is circulated in the circulation cycle, which is formed by the supply pipe, the exhaust pipe, the connection pipe and the compressor. During the air circulation (S2005) the air is heated by an adiabatic compression by the compressor and the heated air warms up the fuel cell until the temperature of the fuel cell exceeds the prescribed temperature. The heated air will not be wasted since the three-way valve is in a return position, which would rapidly warms-up the fuel cell. The compressor 24 itself also generates heat during the compression of the air, which also assists the rapid warm-up of the fuel cell.

Also in this configuration, the fuel cell is disconnected to the driving motor M until the temperature of the fuel cell exceeds prescribed temperature (S2004). At this time the fuel cell is in a previous power generating condition, and the fuel cell is avoided from generating a large electric current in a cold electrochemical reaction condition which could cause a fatal damage to the fuel cell. The driving motor M consumes the largest amount of the electric current produced by the fuel cell compare to the other loads such as the inverters of the accessories.

Again, the fuel cell is in a previous power generation during the course of the warm-up. The prescribed temperature should be the temperature which the fuel cell efficiently generate electric current by the electrochemical reaction, such as 20° C. in the first to sixth embodiment. The prescribed temperature could be established depending on the types of the fuel cell.

Since the fuel cell is in a previous power generating condition, the fuel cell generates small heat by the electrochemical reaction during the previous power generating condition. This heat also helps rapidly warm-up the fuel cell.

During the previous power generation condition, the fuel cell small amount of oxygen in the circulation cycle. It is preferred to provide a sensor for detecting the concentration of the circulation cycle and introducing a fresh air to the circulation cycle when the concentration of the oxygen is decreased due to the previous power generation.

For example, while the hydrogen-supplying apparatus in these embodiments has a configuration that hydrogen is supplied from the hydrogen gas cylinder into the fuel cell, a liquid raw fuel material may be reformed in a reformer, which is supplied into the fuel cell. The humidifier in the first and second embodiment may be one which utilize a two fluid nozzle or supersonic waves. The water-permeable membrane in the third embodiment is also not restricted to the hollow fiber membrane. With regard to the compressor, in addition to a super turbo charger type or a turbo charger type, which revolves a turbine, a reciprocating type may also be utilized.

What is claimed is:

1. A method for warming up a fuel cell system comprising;
   a fuel cell which generates electric power due to an electrochemical reaction between hydrogen and oxygen,
   an air supply pipe for supplying air to the fuel cell as an oxidant gas,
   an air exhaust pipe for discharging exhaust air from the fuel cell to an atmosphere,
   a compressor provided on either of said air supply pipe and said air exhaust pipe, which carries the air and
   a communication pipe which returns said exhaust air to said air supply pipe, and which communicates said exhaust air pipe with said air supply pipe to form a circulation cycle including said compressor;
   said method comprising:
   detecting a temperature of the fuel cell,
   determining whether or not the detected temperature of the fuel cell is lower than a first prescribed temperature, and
   heating said fuel cell by circulating the air, which has been heated by a heat generated due to adiabatic compression through said compressor prior to the generation of the electric power, if the detected temperature of the fuel cell is lower than the first prescribed temperature.

2. The method as claimed in claim 1, further comprising:
   heating said fuel cell until the temperature of the fuel cell exceed a second prescribed temperature at which the fuel cell can efficiently generate the electric power by the electrochemical reaction, wherein the second prescribed temperature is higher than the first prescribed temperature.

3. The method as claimed in claim 2, wherein said fuel cell generates the electric power after the temperature of the fuel cell reaches the second prescribed temperature.

4. An apparatus for warming up fuel cell system comprising:
- a fuel cell which generates an electric power due to an electrochemical reaction between hydrogen and oxygen,
- an air supply pipe for supplying air to the fuel cell as an oxidant gas,
- an air exhaust pipe for discharging exhaust air from the fuel cell to an atmosphere,
- a compressor provided on either of said air supply pipe and said air exhaust pipe, which carries the air
- and a communication pipe which returns said exhaust air to said air supply pipe, and which communicates said exhaust air pipe with said air supply pipe to form a circulation cycle including said compressor;
- a thermo-sensor, which detects a temperature of the fuel cell, and
- control means for controlling said compressor to heat said fuel cell by circulating the air, which has been heated by a heat generated due to adiabatic compression through said compressor prior to the generation of the electric power, if the temperature of the fuel cell detected by the thermo sensor is lower than a first prescribed temperature.

5. The apparatus as claimed in claim 4, wherein said control means controls said compressor to heat the fuel cell until the temperature of the fuel cell exceed a second prescribed temperature at which the fuel cell can efficiently generate the electric power by the electrochemical reaction, wherein the second prescribed temperature is higher than the first prescribed temperature.

6. The apparatus as claimed in claim 5, wherein said control means controls the fuel cell to generate the electric power after the temperature of the fuel cell reaches the second prescribed temperature.

* * * * *